(12) United States Patent
Hindawi et al.

(10) Patent No.: US 8,904,039 B1
(45) Date of Patent: Dec. 2, 2014

(54) LARGE-SCALE NETWORK QUERYING AND REPORTING

(75) Inventors: Orion Hindawi, Berkeley, CA (US); David Hindawi, Berkeley, CA (US); Peter Lincroft, Albany, CA (US); Lisa Lippincott, Berkeley, CA (US)

(73) Assignee: Tanium Inc., Berkeley, CA (US)

( * ) Notice: Subject to any disclaimer, the term of this patent is extended or adjusted under 35 U.S.C. 154(b) by 170 days.

(21) Appl. No.: 13/084,923

(22) Filed: Apr. 12, 2011

Related U.S. Application Data

(63) Continuation-in-part of application No. 12/412,623, filed on Mar. 27, 2009, now Pat. No. 8,086,729.

(60) Provisional application No. 61/113,060, filed on Nov. 10, 2008, provisional application No. 61/323,733, filed on Apr. 13, 2010.

(51) Int. Cl.
*G06F 15/173* (2006.01)
*G06F 15/177* (2006.01)
*G06F 15/16* (2006.01)

(52) U.S. Cl.
USPC .......................... 709/243; 709/217; 709/220

(58) Field of Classification Search
USPC .................................................. 709/217, 243
See application file for complete search history.

(56) References Cited

U.S. PATENT DOCUMENTS

| | | | |
|---|---|---|---|
| 6,049,828 A | 4/2000 | Dev et al. | |
| 6,879,979 B2 * | 4/2005 | Hindawi et al. | 707/779 |
| 7,555,545 B2 | 6/2009 | McCasland | |
| 7,600,018 B2 | 10/2009 | Maekawa et al. | |
| 7,720,641 B2 | 5/2010 | Alagappan et al. | |
| 7,761,557 B2 | 7/2010 | Fellenstein et al. | |
| 7,844,687 B1 * | 11/2010 | Gelvin et al. | 709/220 |
| 8,078,668 B2 * | 12/2011 | Moreau | 709/203 |
| 8,185,615 B1 | 5/2012 | McDysan et al. | |
| 8,271,522 B2 * | 9/2012 | Mehul et al. | 707/770 |
| 8,504,879 B2 | 8/2013 | Poletto et al. | |
| 2002/0073086 A1 * | 6/2002 | Thompson et al. | 707/10 |
| 2003/0212676 A1 * | 11/2003 | Bruce et al. | 707/5 |
| 2005/0108389 A1 | 5/2005 | Kempin et al. | |

(Continued)

FOREIGN PATENT DOCUMENTS

| | | |
|---|---|---|
| EP | 1553747 A1 | 7/2005 |
| EP | 2493118 A1 | 8/2012 |

OTHER PUBLICATIONS

Hood, C. S., Proactive Network-Fault Detection, Sep. 1997, IEEE Transactions on Reliability, vol. 46, No. 3, 9 pages.

(Continued)

*Primary Examiner* — Richard G Keehn
(74) *Attorney, Agent, or Firm* — Morgan, Lewis & Bockius LLP

(57) ABSTRACT

A server receives "registration" messages from nodes in a network, sufficiently infrequently to prevent overburden. Registration messages include information about registering nodes, other nodes, or node relationships. The server sends "instruction" messages to registering nodes, requesting information about the network. Each registering node obtains the requested information, and forwards those messages to other nodes, which act similarly. Nodes receiving instruction messages sometimes send "reporting" messages to the server, providing information it originally requested. The server thus receives detailed information about the network, without communicating with too many nodes, and without aggregating too much of that information. The server can interact with users using only resources growing at O(1) with the size of the network.

21 Claims, 1 Drawing Sheet

(56) References Cited

U.S. PATENT DOCUMENTS

2007/0211651 A1* 9/2007 Ahmed et al. ............... 370/256
2008/0082628 A1* 4/2008 Rowstron et al. ............ 709/217
2008/0133582 A1* 6/2008 Andersch et al. ............ 707/102
2008/0263031 A1 10/2008 George et al.
2008/0288646 A1 11/2008 Hasha et al.
2009/0319503 A1* 12/2009 Mehul et al. ..................... 707/5

OTHER PUBLICATIONS

Stoica, I., et al., "Chord: A Scalable Peer-to-Peer Lookup Service for Internet Applications," SIGCOMM '01, Aug. 27-31, 2001, San Diego, California, 12 pages.

Tanium Inc, "International Search Report and Written Opinion," PCT/US2013/076971, Apr. 4, 2014, 19 pgs.

\* cited by examiner

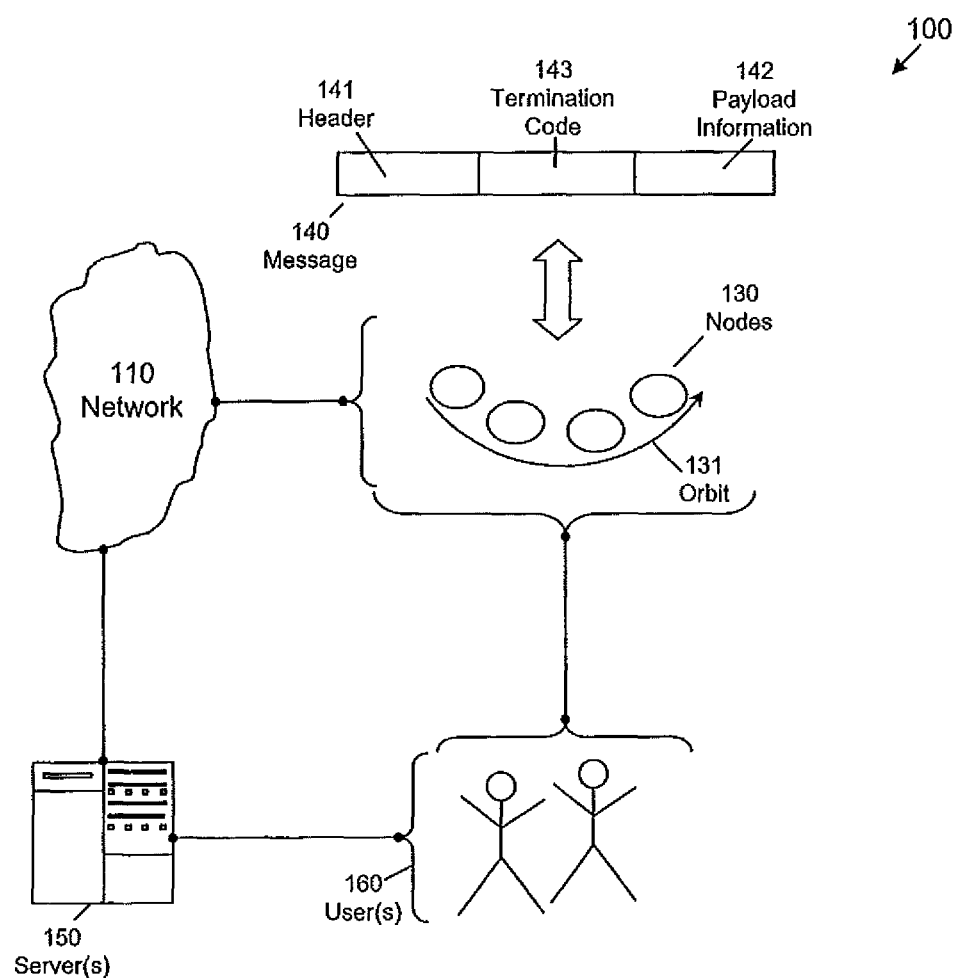

LARGE-SCALE NETWORK QUERYING AND REPORTING

INCORPORATED DISCLOSURES

This application includes the following documents, and claims priority thereof:

U.S. Provisional Patent Application Ser. No. 61/323,733, filed Apr. 13, 2010, in the name of Orion HINDAWI, David HINDAWI, Peter LINCROFT, and Lisa LIPPINCOTT titled "Large-Scale Network Querying and Reporting,";

U.S. patent application Ser. No. 12/412,623, filed Mar. 27, 2009, in the name of David HINDAWI, Orion HINDAWI, Lisa LIPPINCOTT, and Peter LINCROFT, titled "Distributed Statistical Detection of Network Problems and Causes,";

which itself claims priority of

U.S. Provisional Patent Application Ser. No. 61/113,060, filed Nov. 10, 2008, in the name of David HINDAWI, Orion HINDAWI, Lisa LIPPINCOTT, and Peter LINCROFT, titled "Distributed Statistical Detection of Network Problems and Causes,".

Each and every one of these documents is hereby incorporated by reference as if fully set forth herein, including any and all documents incorporated by reference into any one of these documents. These documents are sometimes referred to herein the "Incorporated Disclosures."

BACKGROUND

In a network of communicating machines, such as for example an enterprise network or other computer network, the number of possible configurations, and the amount of data available regarding those possible configurations, grows rapidly with the size of that network. It sometimes occurs that users, such as network administrators or others, desire information about what configuration (or what subset of possible configurations) are currently true of the network.

For example and without limitation, a user might wish to know, of a network having 100,000 nodes, how many or what fraction of them are simultaneously using the "Windows 7™" operating system and the "Firefox™" browser, and of those, how many or what fraction of them are experiencing problems related to lack of free memory. Much other possible information about the network's configuration, whether seeking the presence or absence of a particular element, the prevalence of a particular element, or a correspondence between a $1^{st}$ particular element and a $2^{nd}$ particular element, might be of value, and might be requested by users from time to time.

However, the number of possible configurations, and the amount of data available regarding those possible configurations, grows rapidly with the size of the network. This can present numerous problems for known systems. For example and without limitation:

the desired amount of resources to find that information grows rapidly with the size of the network, making substantially all such requests for information relatively expensive in resources;

the desired amount of communication bandwidth available to report that data, and the desired amount of computing power available to analyze that data to determine whether the network is any particular user-selected set of possible configurations, again grows rapidly with the size of that network, again making substantially all such requests for information relatively expensive in resources;

the desired number of sources of that information, and the desired form of aggregation of that information, can make answers to such requests for information possibly erroneous, such as for example, in the event that any significant amount of the collected data is inaccurate;

the amount of latency in sending information through the network, whether limited by communication bandwidth, computing power, switching speeds, the speed of light, or otherwise, makes it difficult to assess in what state the network is at any particular moment. As to this latter point, known systems have difficulty even in determining a definitive moment at which the configuration of the network is scrutinized, which can make answers to such requests for information unhelpful, or possibly, meaningless.

Known systems also have the drawback that they are unable to communicate or process that amount of information sufficiently quickly and with sufficiently little operational effect on the network. Known systems also have the drawback that they might involve significant hardware and software structures to be added to the network, just to provide their services; these hardware and software structures might themselves have problems with their creation, installation, operation, maintenance, and correction.

SUMMARY OF THE DESCRIPTION

This description includes techniques, including methods, physical articles, and systems, which provide information about a dynamically operating network, even when that network includes a very large number of nodes (such as for example, more than 100,000 such nodes).

A computing device is coupled to the network and disposed for acting as the server in a client-server relationship. The server receives requests from one or more users, and responds to those requests with responses, such as for example answers to questions about the state of the network. In addition or alternatively, the server might initiate action with those clients, might receive instructions for manipulating the network from those clients, or might attempt to manipulate the network on its own initiative. The requests, and messages responsive thereto, are maintained in a relatively compact representation, bounded by a fixed size up to the limit of the requests or responsive messages.

The server receives "registration" messages, from time to time, from a set of nodes coupled to the network, such as for example the set of all such nodes. Each registering node (the particular nodes sending the registration messages) sends its registration messages sufficiently infrequently that the server is not unduly burdened with registration messages, such as for example, only so frequently that the server receives about 10 registration messages per second. One or more registration messages might include information relating to the registering nodes (the particular nodes sending the registration messages), relating to other nodes, or relating to relationships between and among nodes.

The server sends "instruction" messages, to those registering nodes. An instruction message might request information about the network, some subset thereof, or an aggregation of information about described nodes coupled to the network (such as for example, "all nodes with the 'Firefox'" browser installed"). Instruction messages might include directions to manipulate the state of the network, of a set of particular described nodes, or of relationships between and among nodes. The server might limit those questions and instructions to those which are still fresh, to those which the registering nodes have not already fully answered or otherwise responded to, or by other criteria.

Each registering node labels those instruction messages it receives, obtains the requested information or performs the described manipulation (possibly causing the instruction message to be emended or modified), and forwards those instruction messages on a selected orbit. Each node in the orbit similarly receives those instruction messages, acts accordingly, and further forwards the instruction messages in response to selected criteria. For example and without limitation, the selected criteria might include a size of the instruction messages, a number of unique responses to the instruction messages, a hop count of a measure of how many nodes have seen the instruction messages, or other criteria. Those nodes receiving instruction messages, from time to time, send "reporting" messages to the server, providing the server with information it requested or with results of manipulation it requested.

A result of sending, reviewing, modifying, and generating these registration messages, instruction messages, and reporting messages, is that the server is provided with detailed information about the state of the network, without having to either (1) expend substantial resources to communicate with very many nodes about that information, or (2) expend substantial resources to aggregate that information from very many nodes. This has the effect that the server can, with an amount of resources growing only at O(1) with the size of the network, thus, an amount of resources having a fixed and known upper bound, interact with users even for a network with a very large number of nodes.

This has the effect that, for example and without limitation, the server might maintain an upper bound on its response time to users of about 7-10 seconds, even when the network has more than 100,000 nodes, and regardless of the density of the network topology.

Real-World Nature

The invention includes techniques, including methods, physical articles, and systems, that receive real-world information dictated by real-world conditions (not mere inputs to a problem-solving technique). The techniques provided by the invention are transformative of the information received, at least in the sense that incoming data is collected and aggregated according to user request. This has the effect that a $1^{st}$ type of information (such as for example, local widely distributed states of individual nodes) is transformed into a $2^{nd}$ type of information (such as for example, collected and aggregated global values reflecting those local states).

The invention includes techniques that are tied to a particular machine, at least in the sense that particular types of communication and computation, by particular types of devices, are performed in a communication network. While this description is primarily directed to that portion of the invention in which users make requests about, and receive responses about, the state of the network, there is no particular requirement for any such limitation. For example and without limitation, users might direct designable connections to be made or broken, designable information to be collected and aggregated, and designable nodes to perform actions not necessarily otherwise in their instruction stream. This has the effect that interaction between and among elements of the claims systems, or between and among steps of the methods, as performed by devices acting separately, produces one or more advantageous effects.

BRIEF DESCRIPTION OF THE DRAWING FIGURE

FIG. 1 shows a conceptual drawing of a system.

DESCRIPTION

Generality of the Description

This application should be read in the most general possible form. This includes, without limitation, the following:
   References to specific techniques include alternative and more general techniques, especially when discussing aspects of the invention, or how the invention might be made or used.
   References to "preferred" techniques generally mean that the inventors contemplate using those techniques, and think they are best for the intended application. This does not exclude other techniques for the invention, and does not mean that those techniques are necessarily essential or would be preferred in all circumstances.
   References to contemplated causes and effects for some implementations do not preclude other causes or effects that might occur in other implementations.
   References to particular reasons or to particular techniques do not preclude other reasons or techniques, even if completely contrary, where circumstances would indicate that the stated reasons or techniques are not as applicable.

The invention is not in any way limited to the specifics of any particular examples disclosed herein. Many other variations are possible which remain within the content, scope and spirit of the invention, and these variations would become clear to those skilled in the art after perusal of this application.

Definitions and Notations

The following definitions and notations are exemplary, and not intended to be limiting in any way:
   As used herein, the following terms and phrases have these described general meanings. These meanings are intended to be exemplary, not limiting.
      node (and similar terms and phrases) generally indicates a device of any kind, capable of performing either the communicating or the computing tasks ascribed herein
      message (and similar terms and phrases) generally indicates a signal of any kind, capable of being sent from one device of any kind and received by another
      adjusting a message (and similar terms and phrases) generally indicates any kind of change, rewrite, or alteration to that message, including making a copy of that message, which copy is ultimately sent
      local state (and similar terms and phrases) generally indicates status of any kind, capable of being recognized by a particular node; for example, whether the node is relatively burdened computationally would be an example of a part of its local state, as would be whether a node is able to send and receive messages to its neighbors. "Local state" might be used to refer to and include any information available to the node whose "local state" is examined.
      propagating messages (and similar terms and phrases) generally indicates use of a technique of any kind, in which a message, report, or signal is sent from a deciding machine to another machine
      local messages (and similar terms and phrases) generally indicates use of a technique of any kind, in which a message, report, or signal is propagated from substantially one machine to another client and server (and similar terms and phrases) generally refer to a relationship between devices or applications. One "client" or one "server" can comprise any of the following: (a) a single physical device capable of executing software; (b) a portion of a physical device, such as a software process or set of software processes capable of executing on one hardware device; or (c) a plurality of physical devices, or portions thereof, capable of cooperating to form a logical entity.

After reading this application, those skilled in the art would recognize that these definitions and notations would be applicable to techniques, methods, physical elements, and systems—not currently known, or not currently known to be applicable by the techniques described herein—including extensions thereof that would be inferred by those skilled in the art after reading this application, even if not obvious to those of ordinary skill in the art before reading this application.

FIGURES AND TEXT

Where described as shown in a FIGURE, an element might include other items shown in the FIGURE in addition to, or operating in combination or conjunction with, that particular element (or that particular element in combination or conjunction with other elements, whether shown or not shown in the FIGURE, and whether described or not described with respect to the FIGURE).

other items not shown in the FIGURE, but whose inclusion would be known to those skilled in the art, or which would be known after reasonable investigation, without further invention or undue experimentation.

subparts of that element, whether shown or not shown in the FIGURE, which might be convenient for operation of the element, but which are not necessarily required in the described context, or which might be necessary for operation of the element in the described context, but which are not necessary for description at a level understandable to those skilled in the art.

FIG. 1

FIG. 1 shows a conceptual drawing of a system 100, including elements shown in the FIGURE, and including at least a network 110, one or more nodes #130, one or more messages #140, and one or more servers #150. The nodes #130 are coupled to the network 110. Most (but not necessarily all) nodes #130 are capable of at least generating one or more messages #140. Most (but not necessarily all) nodes #130 are capable of receiving one or more such messages #140 and sending one or more such messages #140. The servers #150 are coupled to the network 110, and to one or more users #160, which themselves might or might not be coupled to other nodes #130 coupled to the network 110.

As shown herein, the each message #140 includes a header #141, a termination code #143, and one or more elements of payload information #142. The payload information #142 might include queries from the users #160 regarding one or more states of the network 110, Queries from the users #160 might include requests with respect to the existence of any particular configuration found at one or more nodes #130 coupled to the network, requests with respect to the existence of any particular configuration found between or among nodes #130 coupled to the network, or requests regarding aggregation of such information. For example and without limitation, a query from a user #160 might ask:

if there are any nodes #130 coupled to the network 110 with the "Firefox™" browser installed;

how many nodes #130 coupled to the network 110 have the "Firefox™" browser installed (naturally, if the answer to the query just above is No, the answer to this query should be zero);

if there are more than k nodes #130 coupled to the network 110 with the "Firefox™" browser installed (naturally, if the answer to whether there are any such nodes #130 is No, the answer to this query should be No);

what fraction of nodes #130 coupled to the network 110 have the "Firefox™" browser installed;

of those nodes #130 with the "Firefox™" browser installed, what fraction of those nodes #130 are currently executing in a process spawned by that browser;

what are the network addresses of those nodes #130 with the "Firefox™" browser installed;

of those nodes #130 with the "Firefox™" browser installed, how many distinct operating system configurations are currently in use; or some other query, or any combination or conjunction thereof.

One or more elements of the payload information #142 might include a hash code, or other substantially bounded-size data, in response to a logical representation of a query from a user #160. For example and without limitation, a query from a user #160 might take the form of an SQL statement (such as for example, used to request information from a database) including its structure (such as for example, an AND-OR tree structure of a SELECT query form). A hash code representing that SQL statement and its structure would be included in the payload information #142. In such cases, an SQL statement requesting the number of different operating systems being executed by nodes #130 with the "Firefox" browser installed, might take a form having pseudo-code similar to:

SELECT (
h=Hash {node . name}
WITH Hash (h . OS)=WITH Hash {h.j=Unique { } }
)
AGGREGATED BY Count {j}
where
SELECT indicates an SQL "select" operator;
Hash { } indicates an application of the hash coding function;
a . b indicates a value of a sensor b at a node a;
Unique { } indicates a test for a unique value;
AGGREGATED BY indicates that the results are to be aggregated; and
Count { } indicates a count of distinct such unique values.

Naturally, a wide variety of queries might be represented in this, or a similar, form, while remaining compact and of bounded-size.

While this application primarily describes those cases in which the payload information #142 from users #160 includes queries with respect to one or more states of the network 110, in the context of the invention, there is no particular requirement for any such limitation. For example and without limitation, the payload information #142 might include one or more of:

instructions to inject information (of any kind) into the network 110;

instructions to alter information (of any kind) already present coupled to the network no;

instructions to add to, subtract from, or alter, any aspect of the network no, including without limitation instructions to add nodes, or connections between or among nodes, to the network 110, remove nodes, or connections between or among nodes, to the network 110, or alter the state of nodes, or connections between or among nodes, coupled to the network 110; or some other instructions or queries, or any combination or conjunction thereof.

Naturally, a wide variety of operations, including operations which are recursive, which loop, which have external side-effects, and other constructs known in the many fields of computer science and engineering would also be possible.

While this application primarily describes those cases in which the payload information #142 from users #160 includes queries formatted using concepts associated with SQL database queries, and variants thereof, in the context of the invention, there is no particular requirement for any such limitation. For example and without limitation, the payload information #142 from users #160 might be formatted as an independent code snippet, with that code snippet to be executed at one or more such nodes #130.

Registration Messages

When initially coupled to the network 110, and from time to time (as described herein), each node #130 sends the server #150 one or more messages #140, herein sometimes called "registration messages". Registration messages #140, either alone or collectively, include payload information #142 telling the server #150 that the node #130 is coupled to the network 110 and available to be addressed. The new node #130 tells the server #150 which queries it has not yet acted on.

Techniques for assuring the new node #130 receives all such queries are known in the art of reliable message transmission, such as for example, the FTP (file transfer protocol), and variants thereof. For example and without limitation, the new node #130 might record those queries it has acted upon and for which there are no "holes" (missed queries); it could tell the server #150 the last one of those, allowing the server #150 to tell the new node #130 the next query.

By way of example, if the new node #130 has acted upon queries numbered 101, 102, 103, 105, and 107, it would tell the sender its last such query is number 103; the server #150 would tell the new node #130 the content of query number 104 (and perhaps also 105, 106, and 107). At the next registration message #140, the new node #130 has acted upon query number 104 (and 105, and 107), so it would tell the server #150 it had acted on all queries including number 105 (or, in cases in which the server #150 had also sent the content of queries 105, 106, and 107, all queries including number 107). This has the effect that the new node #130, from time to time, receives all such queries for action.

Alternatively, the server #150 might restrict its update of the queries to the new node #130 in some manner. For example and without limitation:

The server #150 might tell the new node #130 only about those queries that are "fresh", that is, are not older than a selected time, such as for example 750 milliseconds.

The server #150 might tell the new node #130 only about those queries that it has not yet answered to the user #160.

The server #150 might tell the new node #130 only about those queries that it already has a definitive answer to. For example, if one or more users #160 asked if any nodes #130 had "Firefox" installed, and the server #150 has already been able to conclude the answer is Yes, the server #150 need not tell any more new nodes #130 about that query.

In this manner, or in another manner, the new node #130 assures that it receives all meaningful queries from users #160.

Periphery Messages

The server #150 tells the new node #130 about a query from a user #160 using one or more messages #140, herein sometimes called "periphery messages". Periphery messages #140, either alone or collectively, include payload information #142 telling the node #130 the nature and structure of one or more queries, as uniquely identified by their hash codes. The new node #130 obtains information with respect to queries that still need to be acted upon.

The new node #130 selects an orbit #131, including a sequence of nodes #130 coupled to the network no, and for which, when a periphery message #140 returns to the new node #130, that periphery message #140 has been reviewed and acted upon by all nodes #130 in the orbit #131. When an orbit #131 includes all the nodes #130 coupled to the network 110, this has the effect that substantially all nodes #130 coupled to the network 110 will have acted upon the periphery message #140 when the orbit #131 is complete. Selection of orbits #131, their modification and use, and their advantages and alternatives, are described in further detail in the Incorporated Disclosures.

While this application primarily describes those cases in which there is substantially a single orbit #131 and in which that single orbit #131 includes substantially all nodes #130 coupled to the network 110, in the context of the invention, there is no particular requirement for any such limitation. For example and without limitation, the new node #130 might be coupled to nodes #130 in a set of orbits #131, which collectively span the complete set of nodes #130 coupled to the network 110. In such cases, the new node #130 might propagate a periphery message #140 upon each of those orbits #131, for queries in which coverage of substantially all nodes #130 coupled to the network 110 is desirable or desired.

As the periphery message #140 is propagated along the selected orbit #131, each node #130 coupled to that orbit #131 in turn receives the periphery message #140, acts upon it, and further propagates it along that orbit #131. Each node #130
 receives the periphery message #140;
 parses it to determine its payload information #142;
 parses that payload information #142 to determine a query that is being asked;
 acts upon that query to answer it for that particular node #130 (that is, for itself)—this is so even if the query seeks aggregated or otherwise globally identifiable information;
 modifies the periphery message #140 to reflect the answer it obtained for itself; and
 propagates the periphery message #140 to the next node #130 in the orbit.

In some cases, the action taken by the receiving node #130 might be to generate a report message #140 (as described below), erase the data collected in the periphery message #140, and continue to propagate the periphery message #140 as if on a clean slate. In some cases, the action taken by the receiving node #130 might be to delete the periphery message #140, with the effect of preventing it from further propagating along the orbit #131, likely but not necessarily after generating a report message #140.

Each periphery message #140 might include, accessible using its payload header #142
 an indicator of the query, such as for example the hash code described above;
 an indicator of the answers collected so far in response to the query, such as for example each unique answer obtained from a node #130, coupled to the orbit #131, which has so far propagated the periphery message #140;

an indicator of the number of unique such answers, or of a size of the collection of such answers;

an indicator of a TTL (time to live) for the periphery message #140, measured in further allowed hops, or possibly in some other form, such as for example, processing time or wall clock time;

an indicator of a number of times the periphery message #140 has been erased and reported to the server #150.

While this application primarily describes those cases in which periphery messages #140 are substantially identical in form, in the context of the invention, there is no particular requirement for any such limitation. Periphery messages #140 might be tailored to the nature of the query, the nature of the orbit #131 or the nodes #130 coupled to that orbit #131, the nature of the answer, other factors, or some combination or conjunction thereof.

Moreover, while this application primarily describes those cases in which periphery messages #140 are substantially guaranteed to be sent from each node #130 coupled to an orbit #131, to the next node #130 coupled to that orbit #131, in the context of the invention, there is no particular requirement for any such limitation. For a $1^{st}$ example and without limitation, periphery messages #140 might be propagated statistically, as described in further detail in the Incorporated Disclosures. For a $2^{nd}$ example and without limitation, periphery messages #140 might be propagated along fast-track sections or highways for the orbit #131, with the effect that selected types of queries (such as for example, Yes/No "is this present anywhere in the network 110" queries, and similar cases) might be performed more rapidly, with less latency, or using less communication bandwidth. In this $2^{nd}$ example, such Yes/No queries might be treated similarly to prevalence questions as described in the Incorporated Disclosures.

Report Messages

From time to time, as described above with respect to periphery messages #140, one or more nodes #130 might send collected data to the server #150 using one or more messages #140, herein sometimes called "report messages". Report messages #140, either alone or collectively, include payload information #142 telling the server #150 the collected data and any aggregation thereof, as described above. The server #150 aggregates this new information with information it has already collected, with respect to queries that are still being acted upon.

The server #150 maintains separate information with respect to each such query, until it occurs that the server #150 decides its processing of the query is complete, and is ready to answer the query. In such cases, the server #150 sends a message #140 to the user #160 originally requesting the query, providing an answer to that query. For example and without limitation, the server #150 might decide to answer the user's query when substantially all nodes #130 have reported, when some selected fraction (such as for example, 75%) of all nodes #130 have reported, when data collected for the answer to the query exceeds a selected size, when a selected amount of time has elapsed, for other reasons, or some combination or conjunction thereof.

While this application primarily describes those cases in which users #160 ask only queries with respect to one or more states of the network 110, in the context of the invention, there is no particular requirement for any such limitation. For example and without limitation, in cases in which users #160 might provide instructions to nodes #130 in the network 110, as described above, the server #150 might answer merely that the instructions have been performed, or might provide more detail. For example and without limitation, that more detail might include a set of data collected after the instructions were performed, or an indicator of which nodes #130 were affected by, or were able to perform, the designated instructions.

ALTERNATIVE EMBODIMENTS

The invention has applicability and generality to other aspects of network control, management, and reporting, including at least substantial applicability in combination with or in conjunction with techniques described in the Incorporated Disclosures substantial applicability in deploying, error-checking, and routing, messages in a network;

substantial applicability in parallel processing of information distributed between and among nodes in a network.

The invention claimed is:

1. A computer-implemented method, comprising:
at a server of a network comprising a non-static collection of machines:
receiving an information request through an interface provided by the server, the information request specifying a type of information to be collected from the non-static collection of machines;
in response to the information request, sending a request message to a first machine of a message propagation path formed by a plurality of machines currently coupled to the network,
wherein the request message specifies the type of information to be collected,
wherein the request message is propagated along the message propagation path from the first machine, through one or more intermediate machines of the message propagation path, to a second machine of the message propagation path, and
wherein, during the propagation of the request message from the first machine to the second machine, the request message accumulates respective local result information available to each machine along the message propagation path before being forwarded to a next machine along the message propagation path; and
receiving a report message from the second machine, wherein the report message is generated by the second machine based on at least the result information accumulated in the request message received by the second machine, wherein each of the first machine and the one or more intermediate machines has performed a statistical evaluation of the accumulated result information in the request message to determine whether to continue the propagation of the request message to another machine along the propagation path and to determine whether to report currently accumulated result information to the server.

2. The method of claim 1, further comprising:
at the server of the network:
receiving respective registration messages from each of the plurality of machines currently coupled to the network, wherein each of the plurality of machines is configured to send registration messages to the server at a respective frequency such that a load on the server has an upper bound limited to a constant with respect to a varying size of said network.

3. The method of claim 1, further comprising:
at the server of the network:
sending an instruction message to the first machine of the message propagation path formed by the plurality of machines currently coupled to the network, wherein the instruction message specifying (1) an action to be performed by a subset of the plurality of machines and (2) a criterion for selecting the subset of the plurality of machines, and wherein the instruction is propagated through each machine of the message propagation path, and each machine of the message propagation path receives the instruction message from a respective machine, if any, immediately preceding said each machine in the message propagation path, determines whether to perform the action based on whether the criterion is satisfied by said each machine, and forwards the instruction message to a respective machine, if any, immediately succeeding said each machine in the message propagation path.

4. The method of claim 3, wherein the instruction message is generated automatically, without user input, by the server.

5. The method of claim 3, wherein the instruction message is generated in response to user input.

6. The method of claim 1, wherein the request message includes a header, a termination code, and one or more elements of payload information, and wherein the payload information includes a hash code corresponding to a logical representation of the information request.

7. The method of claim 1, wherein the request message includes an indicator of a time to live (TTL) for the request message, the TTL being measured by a specified number of hops from machine to machine in the network.

8. A non-transitory computer-readable medium having instructions stored thereon, the instructions, when executed by one or more processors, cause the processors to perform operations comprising:
    at a server of a network comprising a non-static collection of machines:
        receiving an information request through an interface provided by the server, the information request specifying a type of information to be collected from the non-static collection of machines;
        in response to the information request, sending a request message to a first machine of a message propagation path formed by a plurality of machines currently coupled to the network,
            wherein the request message specifies the type of information to be collected,
            wherein the request message is propagated along the message propagation path from the first machine, through one or more intermediate machines of the message propagation path, to a second machine of the message propagation path, and
            wherein, during the propagation of the request message from the first machine to the second machine, the request message accumulates respective local result information available to each machine along the message propagation path before being forwarded to a next machine along the message propagation path; and
        receiving a report message from the second machine, wherein the report message is generated by the second machine based on at least the result information accumulated in the request message received by the second machine, wherein each of the first machine and the one or more intermediate machines has performed a statistical evaluation of the accumulated result information in the request message to determine whether to continue the propagation of the request message to another machine along the propagation path and to determine whether to report currently accumulated result information to the server.

9. The computer-readable medium of claim 8, wherein the operations further comprise:
    at the server of the network:
        receiving respective registration messages from each of the plurality of machines currently coupled to the network, wherein each of the plurality of machines is configured to send registration messages to the server at a respective frequency such that a load on the server has an upper bound limited to a constant with respect to a varying size of said network.

10. The computer-readable medium of claim 8, wherein the operations further comprise:
    at the server of the network:
        sending an instruction message to the first machine of the message propagation path formed by the plurality of machines currently coupled to the network, wherein the instruction message specifying (1) an action to be performed by a subset of the plurality of machines and (2) a criterion for selecting the subset of the plurality of machines, and wherein the instruction is propagated through each machine of the message propagation path, and each machine of the message propagation path receives the instruction message from a respective machine, if any, immediately preceding said each machine in the message propagation path, determines whether to perform the action based on whether the criterion is satisfied by said each machine, and forwards the instruction message to a respective machine, if any, immediately succeeding said each machine in the message propagation path.

11. The computer-readable medium of claim 10, wherein the instruction message is generated automatically, without user input, by the server.

12. The computer-readable medium of claim 10, wherein the instruction message is generated in response to user input.

13. The computer-readable medium of claim 8, wherein the request message includes a header, a termination code, and one or more elements of payload information, and wherein the payload information includes a hash code corresponding to a logical representation of the information request.

14. The computer-readable medium of claim 8, wherein the request message includes an indicator of a time to live (TTL) for the request message, the TTL being measured by a specified number of hops from machine to machine in the network.

15. A server system of a network comprising a non-static collection of machines, comprising:
    one or more processors; and
    memory having instructions stored thereon, the instructions, when executed by the one or more processors, cause the processors to perform operations comprising:
        receiving an information request through an interface provided by the server, the information request specifying a type of information to be collected from the non-static collection of machines;
        in response to the information request, sending a request message to a first machine of a message propagation path formed by a plurality of machines currently coupled to the network,
            wherein the request message specifies the type of information to be collected,
            wherein the request message is propagated along the message propagation path from the first machine, through one or more intermediate machines of the message propagation path, to a second machine of the message propagation path, and wherein, during the propagation of the request message from the first machine to the second machine, the request message accumulates respective local result information available to each machine along the message propagation path before being forwarded to a next machine along the message propagation path; and receiving a report message from the second machine, wherein the report message is generated by the second machine based on at least the result information accumulated in the request message received by the second machine, wherein each of the first machine and the one or more intermediate machines has performed a statistical evaluation of the accumulated result information in the request message to determine whether to continue the propagation of the request message to another machine along the propagation path and to determine whether to report currently accumulated result information to the server.

16. The server system of claim 15, wherein the operations further comprise:

receiving respective registration messages from each of the plurality of machines currently coupled to the network, wherein each of the plurality of machines is configured to send registration messages to the server at a respective frequency such that a load on the server has an upper bound limited to a constant with respect to a varying size of said network.

17. The server system of claim 15, wherein the operations further comprise:

sending an instruction message to the first machine of the message propagation path formed by the plurality of machines currently coupled to the network, wherein the instruction message specifying (1) an action to be performed by a subset of the plurality of machines and (2) a criterion for selecting the subset of the plurality of machines, and wherein the instruction is propagated through each machine of the message propagation path, and each machine of the message propagation path receives the instruction message from a respective machine, if any, immediately preceding said each machine in the message propagation path, determines whether to perform the action based on whether the criterion is satisfied by said each machine, and forwards the instruction message to a respective machine, if any, immediately succeeding said each machine in the message propagation path.

18. The server system of claim 17, wherein the instruction message is generated automatically, without user input, by the server.

19. The server system of claim 17, wherein the instruction message is generated in response to user input.

20. The server system of claim 15, wherein the request message includes a header, a termination code, and one or more elements of payload information, and wherein the payload information includes a hash code corresponding to a logical representation of the information request.

21. The server system of claim 15, wherein the request message includes an indicator of a time to live (TTL) for the request message, the TTL being measured by a specified number of hops from machine to machine in the network.

* * * * *